United States Patent [19]

Dorling

[11] 4,165,021
[45] Aug. 21, 1979

[54] HOT OR COLD OPERATING CAST PRESSURE CONTAINER

[75] Inventor: Rolf Dörling, Gummersbach, Fed. Rep. of Germany

[73] Assignee: L. & C. Steinmüller GmbH, Gummersbach, Fed. Rep. of Germany

[21] Appl. No.: 835,045

[22] Filed: Sep. 21, 1977

[30] Foreign Application Priority Data

Sep. 24, 1976 [DE] Fed. Rep. of Germany ....... 2643011

[51] Int. Cl.² .......................... B65D 7/42; B65D 25/18
[52] U.S. Cl. ...................................... 220/468; 220/83; 220/445
[58] Field of Search .................... 220/15, 3, 9 R, 9 A, 220/9 LG, 63 R, 71, 83, 84, 12, 425, 445, 468, 470

[56] References Cited

U.S. PATENT DOCUMENTS

| | | | |
|---|---|---|---|
| 1,940,277 | 12/1933 | Stresau | 220/9 A |
| 3,091,845 | 6/1963 | Herman et al. | 220/83 X |
| 3,335,904 | 8/1967 | Anderson | 220/9 R X |
| 3,354,913 | 11/1967 | Goto | 220/63 R X |
| 3,907,151 | 9/1975 | Gilden | 220/63 R |
| 4,000,595 | 1/1977 | Fortescue | 220/9 LG X |
| 4,050,609 | 9/1977 | Okamoto et al. | 220/9 LG |

Primary Examiner—William Price
Assistant Examiner—Steven M. Pollard
Attorney, Agent, or Firm—Becker & Becker, Inc.

[57] ABSTRACT

A hot or cold operating cast pressure container having an inner steel lining which positively or nearly positively engages the inner wall of the cast pressure container directly or indirectly through the intervention of a filling compound having thermal insulation. The cast pressure container also has a framework for stabilizing the lining against undue deformations. This framework is connected with the cast structure by anchoring elements. Spacers are provided between the framework and the lining.

7 Claims, 3 Drawing Figures

HOT OR COLD OPERATING CAST PRESSURE CONTAINER

The present invention relates to a hot or cold operating cast pressure container having an inner steel lining which positively or nearly positively engages the inner wall of the cast pressure container directly or indirectly through the intervention of a filling compound having thermal insulating properties. The cast pressure container also has means for stabilizing the lining against undue deformations.

Hot and cold operating cast pressure containers have already been proposed according to which the steel lining is directly connected with the cast piece or system by means of anchoring elements. These structures require a large number of anchoring elements which must be welded to the lining and must be anchored in the cast structure. Considering the deformations which can occur in this connection, a positive engagement can only be produced at great expense. The drawbacks resulting from manufacturing operations are especially bad when the lining is subjected to stresses within the elastic limits, that is, the deformations which occur during manufacturing operations lead to instabilities.

In order to prevent or counter these undue deformations, it has already been proposed to provide the steel lining with inwardly directed stabilizing elements which extend longitudinally and transversely. The realization of the proposed solution is insufficient within the elastic limits.

It is therefore an object of the present invention to stabilize the lining, which directly or indirectly nearly positively engages a cast structure, against the undue deformations which result from initial stress and/or thermal stress.

This object and other objects and advantages of the present invention will appear more clearly from the following specification in connection with the accompanying drawings, in which.

The cast pressure container pursuant to the present invention is characterized primarily in that the means for stabilizing the lining against undue deformations comprises a framework located within the cast pressure container. This framework is connected with the cast structure by anchoring elements. The present invention is further characterized in that spacers are provided between the framework and the lining.

In order, also during thermal stress, to only elastically stress the framework, the present invention further provides that the framework be split into individual sections which are independent of one another.

The framework of the present invention can operate directly against the lining through the intervention of reinforcing elements, or instead can also operate indirectly against the lining through the intervention of the cover of an inner thermal insulation. When using an inner thermal insulation, the present invention further provides that the spacers substantially abut the cover of the insulation.

Pursuant to a further specific embodiment of the present invention, the spacers are firmly connected with the framework and loosely abut the lining or the cover of the insulation.

Figure 1:
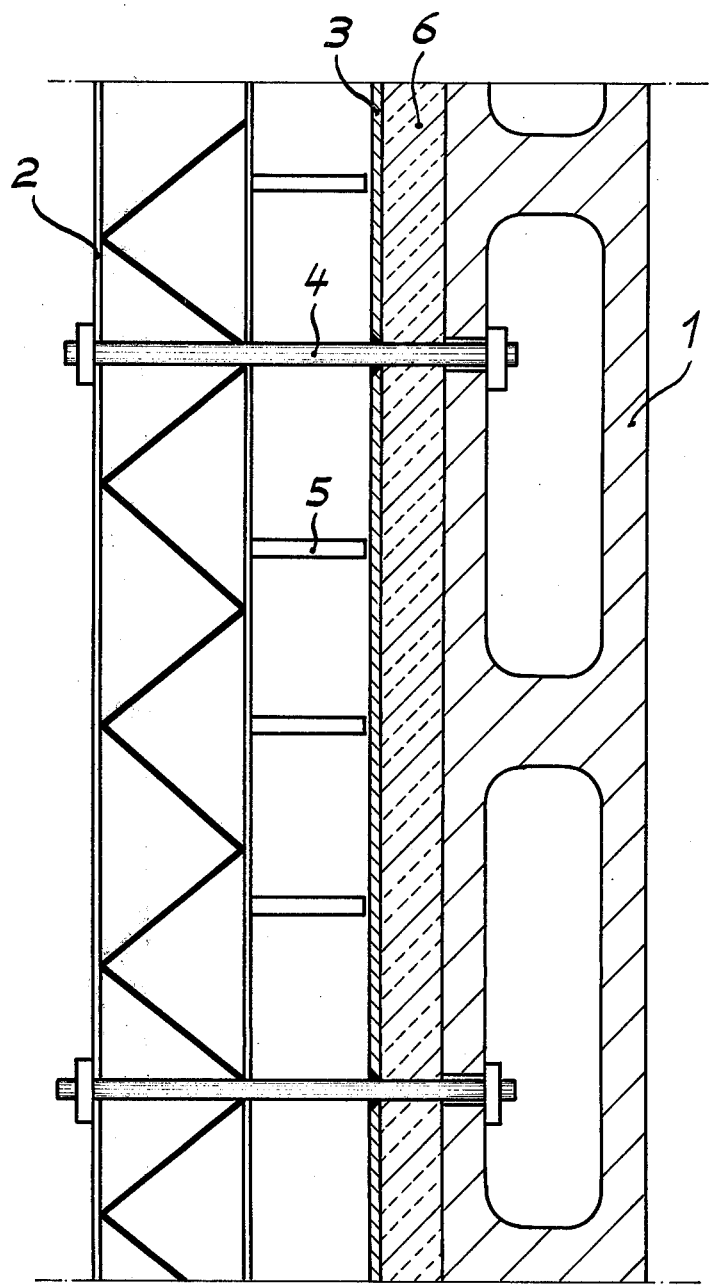
FIG. 1 shows a first specific embodiment of the present invention, according to which a back fill mass (Hinterfullmasse) having a thermal insulating effect is provided between the steel lining and the cast pressure container.
Figure 2:
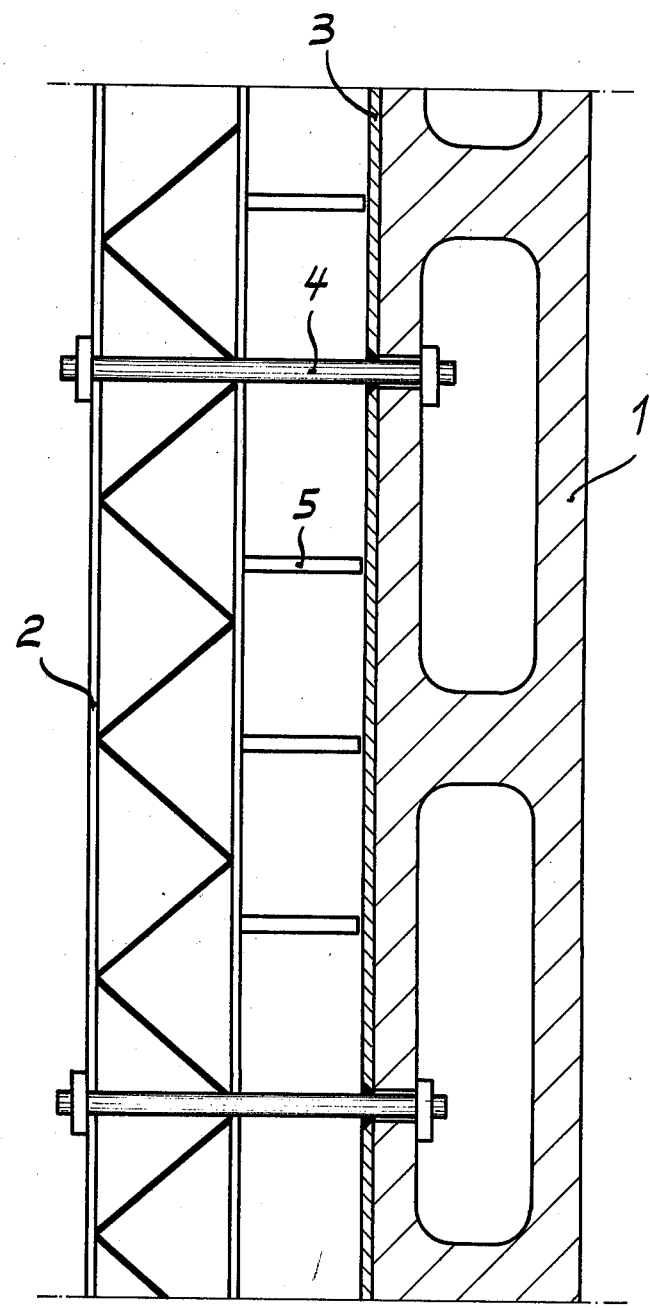
FIG. 2 shows the structure of FIG. 1 without a back fill mass.
Figure 3:
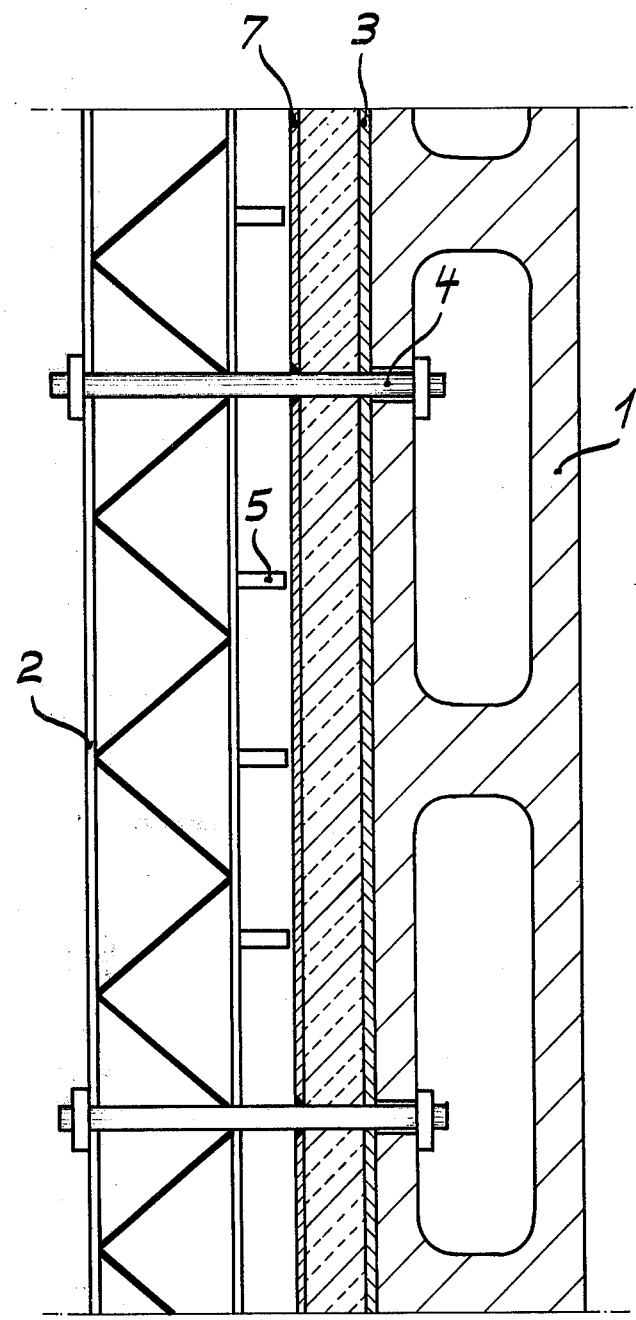
FIG. 3 shows another specific embodiment of the present invention with an inner thermal insulation.

Referring now to the drawings in detail, the steel lining 3, by means of the framework 2, either directly (FIG. 2) or indirectly through the intervention of a back fill mass or compound 6, nearly positively engages or presses against the cast pressure container 1. Spacers 5 are provided between the framework 2 and the steel lining 3. The spacers 5 are connected to the framework 2 and loosely abut the lining 3 (FIG. 1). With the specific embodiment of FIG. 3, which shows another inner thermal insulation 6 on the lining 3, the spacers 5 abut the cover 7 of this thermal insulation. The framework 2 is connected with the cast pressure container by the anchoring elements 4.

The back fill mass or filling compound 6 may comprise metallic or nonmetallic granulate as well as a homogeneous substance such as concrete. Depending upon its composition, the fill mass 6 is between 100 and 150 mm thick. The spacers 5 and the framework 2 comprise austenitic or ferritic steel. The cast pressure container 1 may comprise gray cast iron or cast steel. The steel lining 3 comprises austenitic, ferritic or non-ferrous metal, and is between 6 to 20 mm thick.

The advantages which are achieved by means of the present invention are as follows:

(1) The number of anchoring elements, which connect the framework with the cast structure, is minimal;

(2) As a result of the loose abutment of the spacers against the lining, deformations of the lining as a result of manufacturing operations no longer result;

(3) For the reinforcement of the structure, a material can be chosen which has no affinity for the material of the lining; and (4) The reinforcing structure will only be subjected to stresses within the elastic limits, even if the lining is deformed.

It is, of course, to be understood that the present invention is by no means limited to the specific showing of the drawings, but also encompasses any modifications within the scope of the appended claims.

What I claim is:

1. A pressure container comprising: a cast-iron container having an inner wall, a steel lining fixed inside said inner wall, means inside said lining to protect the lining and for stabilizing said lining against deformation and denting, said means being in the form of a framework spaced from said lining, spaced individual anchoring elements extending through said framework and said lining and connecting said framework to said container, and spacer elements fixed to said framework for spacing said framework from said steel lining, while closely abutting said steel lining.

2. A cast pressure container in combination according to claim 1, in which said lining directly engages the inner wall of said container.

3. A cast pressure container in combination according to claim 1, in which a thermal insulating filling compound is interposed between said lining and the inner wall of said container.

4. A cast pressure container in combination according to claim 1, in which a thermal insulating filling compound is located on said lining between the latter and said framework and in which cover means are located on said filling compound between the latter and said spacers, said spacers engaging said cover means.

5. A cast pressure container in combination according to claim 1, in which said framework comprises individual sections which are independent of one another.

6. A cast pressure container in combination according to claim 1, in which said spacers are firmly connected to said framework and loosely engage said lining.

7. A cast pressure container in combination according to claim 4, in which said spacers are firmly connected to said framework and loosely engage said cover means.

* * * * *